Patented July 14, 1953

2,645,668

UNITED STATES PATENT OFFICE 2,645,668

CONDENSATION OF ALCOHOLS IN THE PRESENCE OF CALCIUM OXIDE

Edward E. Burgoyne, Bartlesville, Okla., and Francis E. Condon, Borger, Tex., assignors to Phillips Petroleum Company, a corporation of Delaware No Drawing. Application October 1, 1951, Serial No. 249,227

10 Claims. (Cl. 260—642)

This invention relates to the condensation of primary alcohols in the presence of calcium oxide to produce higher molecular weight alcohols. In one of its aspects the invention relates to the production of very specific products of alcohol condensation.

At present, most of the higher alcohols are recovered from natural sources, and the costs of recovering these alcohols are rather high. The uses for these alcohols, however, are rather great, for they are of value in the synthesis of other organic compounds and may be dehydrated to produce corresponding olefins of high purity.

The process of this invention comprises the steps of condensing primary alcohols at elevated temperature and pressure in the presence of a contact material consisting essentially of calcium oxide and subsequently recovering the product from the reaction mixture. The recovery step may be ordinary fractionation, with separation of the various components of the mixture produced, including recovery of the unconverted charge alcohol for recycle. The process may be carried out in either a batch or continuous manner, and conventional equipment may be used.

The carbon atoms in the condensation products of the invention, letting $m$ equal the number of molecules of alcohol each containing $n$ carbon atoms per molecule, can be represented by $mn-1$. Thus, the following reactions indicate the nature of the condensations effected according to this invention.

(a) $2C_3H_7OH \rightarrow$ 3-pentanol
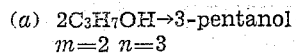

(b) $3C_3H_7OH \rightarrow$ 4-Me-3-Heptanol
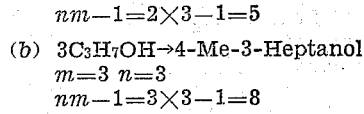

In other terms, 2 moles of reactant propanol condense to give a $C_5$ alcohol as in (a), or 3 moles may condense to give a $C_8$ alcohol as in (b).

Likewise, 2 moles of ethanol ($n=2$, $m=2$) condense to give 2-propanol $$(nm-1=2\times2-1=3)$$

or 3 moles of ethanol may condense to give 2 pentanol ($3\times2-1=5$).

The present invention differs from that described in the copending application, Serial No. 249,092, filed October 1, 1951, by Edward E. Burgoyne, in that calcium oxide instead of calcium hydroxide is the contact mass of the present invention. Furthermore, the chief reaction of the cited copending application is represented by Equation $a$, whereas, according to the present invention the reaction represented by Equation $b$ is promoted to a much greater extent. Thus the invention disclosed and claimed in the present application differs from that disclosed and claimed in the cited copending application as regards both the contact mass used and the resulting reactions and products.

The alcohols used as charge stocks for this process are the normal primary alkanols having from two to eight carbon atoms per molecule. Examples are ethanol, 1-propanol, 1-butanol, etc. Mixtures of these alcohols may be used where desirable. The process is ordinarily operated within a temperature range of 350° C. to 450° C., preferably 375°–425° C. The pressure is high and is preferably about 200 p. s. i. or higher, though usually not over 1000 p. s. i. and more preferably 400 to 960 p. s. i. The feed rate is ordinarily within the range of 1 to 10 moles of charge material per kilogram of calcium oxide per hour. The calcium oxide used as a contact material may be either in pelleted or in granular form. The exact size of the catalyst is not critical, although where pellets are used, the ⅛″ x ⅛″ size is quite satisfactory. Where granular calcium oxide is used, 8 to 14 mesh is satisfactory.

Example I

A charge of 1-propanol was passed over calcium oxide at 400° C. and 600 p. s. i. at a rate of 3.7 moles per kilogram of calcium oxide per hour. The catalyst was in the form of ⅛″ x ⅛″ pellets. The effluent consisted of 0.88 mole of gas per mole of propanol charged and 58 weight per cent of liquid product. The liquid product had the following composition:

| | Weight per cent |
|---|---|
| Light ends | 4.2 |
| 1-propanol | 24.7 |
| 3-pentanol | 24.4 |
| 2-methyl-1-pentanol | 9.7 |
| 4-methyl-3-heptanol | 19.6 |
| Residue | 17.4 |

The chief products of the reaction in accordance with this invention were 3-pentanol ($m=2$, $n=3$, $mn-1=5$) and 4-methyl-3-heptanol ($m=3$, $n=3$, $mn-1=8$). Higher-boiling alcohols were also formed ($m>3$). When calcium hydroxide is used as the contact mass, substantially no 4-methyl-3-heptanol is obtained. This shows that calcium oxide, which is the contact material in accordance with the present invention, has a specific directive effect that calcium hydroxide (disclosed and claimed as contact material in cited copending application Serial No. 249,092, filed October 1, 1951, by Edward E. Burgoyne) does not have.

*Example II*

Ethanol was contacted with calcium oxide pellets at 400° C., 600 p. s. i. (average pressure), and a flow rate of 9.2 moles of ethanol per kilogram of calcium oxide per hour. The following results were obtained:

| | |
|---|---|
| Gas yield, mole/mole of ethanol charged | 0.31 |
| Liquid yield, weight per cent of charge | 51 |
| Liquid composition, weight per cent: | |
|     Light ends | 2.8 |
|     Ethanol | 67.0 |
|     2-propanol | 9.2 |
|     3-pentanol | 7.2 |
|     4-heptanol | 3.6 |
|     Heavier | 10.2 |

The chief products were 2-propanol ($m=2$, $n=2$, $mn-1=3$), 3-pentanol ($m=3$, $n=2$, $mn-1=5$), 4-heptanol ($m=4$, $n=2$, $mn-1=7$), and heavier alcohols ($m>4$). The pattern of reaction previously described is again clearly demonstrated by this product distribution.

From the foregoing examples, it is obvious to one skilled in the art that 1-butanol, 1-pentanol, and 1-octanol are also operative in the process of this invention.

Reasonable variation and modification are possible within the scope of the foregoing disclosure and the claims to the invention, the essence of which is that normal primary alkanols are condensed to higher alcohols of $mn-1$ carbon atoms, $m$ representing the number of molecules of starting alcohol condensing together and $n$ representing the number of carbon atoms in each of said molecules, by contacting with calcium oxide at a temperature in the range 350° to 450° C. and a pressure in the range 200 to 1000 p. s. i. and recovering the product alcohols.

Reference is hereby made to copending application Serial No. 133,037, filed December 15, 1949, by Edward E. Burgoyne, and now abandoned.

We claim:

1. A process which comprises condensing $m$ molecules of a normal primary alcohol having $n$ carbon atoms per molecule to obtain a higher alcohol having $mn-1$ carbon atoms per molecule, which process comprises contacting said normal primary alcohol at a temperature in the range 350 to 450° C. and a pressure in the range 200 to 1000 p. s. i. in the presence of a contact material consisting essentially of calcium oxide, $n$ being an integer in the range 2 to 8, and recovering said higher alcohol as a product.

2. The process of claim 1 in which the primary alcohol is ethanol.

3. The process of claim 1 in which the primary alcohol is 1-propanol.

4. The process of claim 1 in which the primary alcohol is 1-butanol.

5. The process of claim 1 in which the primary alcohol is 1-pentanol.

6. The process of claim 1 in which the primary alcohol is 1-octanol.

7. The condensation of $m$ molecules of ethyl alcohol to a higher alcohol having $2m-1$ carbon atoms to the molecule which comprises condensing said alcohol at a temperature of about 400° C., at a pressure of about 600 pounds per square inch and in the presence of a contact material consisting essentially of calcium oxide.

8. The condensation of $m$ molecules of 1-propanol to a higher alcohol having $3m-1$ carbon atoms to the molecule which comprises condensing said propanol at a temperature of about 400° C., at a pressure in the range of 400 to 960 pounds per square inch and in the presence of a contact material consisting essentially of calcium oxide.

9. A process which comprises contacting ethanol at a temperature in the range 375 to 425° C., a pressure in the range 400 to 960 p. s. i. and a charge rate in the range 1 to 10 mols of ethanol per kilogram of contact mass per hour, with a contact mass consisting of calcium oxide, thereby forming 2-propanol, 3-pentanol and 4-heptanol, and recovering said 2-propanol, 3-pentanol and 4-heptanol as products.

10. A process for converting normal propanol to 3-pentanol and 4-methyl-3-heptanol, which process comprises contacting normal propanol with a contact mass consisting of calcium oxide at a contact temperature of 375 to 425° C., a contacting pressure of 400 to 960 p. s. i. and a charge rate in the range 1 to 10 mols of normal propanol per kilogram of contact mass per hour, and recovering 3-pentanol and 4-methyl-3-heptanol as products of the process.

EDWARD E. BURGOYNE.
FRANCIS E. CONDON.

References Cited in the file of this patent

UNITED STATES PATENTS

| Number | Name | Date |
|---|---|---|
| 1,755,692 | Herrmann et al. | Apr. 22, 1930 |
| 1,910,582 | Wibuat | May 23, 1933 |

FOREIGN PATENTS

| Number | Country | Date |
|---|---|---|
| 282,448 | Great Britain | Mar. 19, 1929 |
| 335,631 | Great Britain | Oct. 2, 1930 |
| 637,909 | Germany | Nov. 6, 1936 |